United States Patent [19]

Yokoe et al.

[11] Patent Number: 5,003,897

[45] Date of Patent: Apr. 2, 1991

[54] SEWING SYSTEM

[75] Inventors: Masaaki Yokoe, Nagoya; Yoshikazu Kurono, Aichi; Koji Hayashi, Nagoya, all of Japan

[73] Assignee: Brother Kogyo Kabushiki Kaisha, Japan

[21] Appl. No.: 395,521

[22] Filed: Aug. 18, 1989

[30] Foreign Application Priority Data

Aug. 20, 1988 [JP] Japan .................................. 63-206628

[51] Int. Cl.⁵ .............................................. D05B 21/00
[52] U.S. Cl. ................................ 112/121.12; 112/155; 112/309
[58] Field of Search ....................... 112/121.12, 121.11, 112/121.15, 103, 155, 2, 262.3, 311, 309

[56] References Cited

U.S. PATENT DOCUMENTS

| 3,670,675 | 6/1972 | Rovin et al. | 112/121.12 |
| 4,479,446 | 10/1984 | Johnson et al. | 112/121.12 |
| 4,510,875 | 4/1985 | Peck | 112/121.12 |
| 4,592,295 | 6/1986 | Cordier | 112/121.12 X |
| 4,608,936 | 9/1986 | Ball et al. | 112/121.12 |
| 4,635,574 | 1/1987 | Fujita et al. | 112/121.12 |
| 4,756,261 | 7/1988 | Gershoni | 112/262.3 |

FOREIGN PATENT DOCUMENTS

| 3406325 | 2/1984 | Fed. Rep. of Germany . |
| 3406325 | 8/1985 | Fed. Rep. of Germany . |
| 1254445 | 11/1971 | United Kingdom . |
| 2021287 | 4/1979 | United Kingdom . |

Primary Examiner—Peter Nerbun
Attorney, Agent, or Firm—Oliff & Berridge

[57] ABSTRACT

A sewing system for substantially automatically producing a stitched textile articles by employing a plurality of sewing machines arranged at every manufacturing step. The sewing system includes a holder for holding a workpiece, a plurality of sewing machines capable of performing programmed sewings, a holding member releasably holding the holder, and driving means effecting relative movement between a needle and the holding member in accordance with a sewing program for the programmed sewing, a transferring unit for selectively moving the holder to one of the sewing machines, identification means for identifying a kind of the holder, a memory unit storing therein the sewing programs and data indicative of transferring destinations of the holder transferred by the transferring unit, the sewing programs and the destination data being stored with respect to every kind of one of the holder and the workpiece, and a control unit for reading the sewing program and the destination data from the memory unit in accordance with a result of identification by means of the identification means, and for transmitting the read sewing program to the sewing machine toward which the holder is transferred, as well as for driving the transferring unit in accordance with the destination data.

7 Claims, 6 Drawing Sheets

SEWING SYSTEM

BACKGROUND OF THE INVENTION

The present invention relates to a sewing system for substantially automatically producing a stitched workpiece such as textile, leather, etc by employing a plurality of sewing machines arranged at every manufacturing step.

One conventional sewing system of this type is disclosed in, for example, U.S. Pat. No. 4,635,574. According to the sewing system, a plurality of sewing machines performing corresponding manufacturing steps and workpiece feed-in feed-out devices are linearly juxtaposed with each other and positioned opposite to one another along and with respect to a workpiece transferring conveyer. After the workpiece is introduced onto the transferring conveyor by a workpiece introducing device at an upstream end of the conveyer, a decision is made on the kind of the workpiece by a sensor provided at the workpiece feed in feed out devices, and the workpiece is supplied into each of the sewing machines by the feed-in device so as to be subjected to sewing in accordance with a sewing pattern provisionally stored.

However, according to the conventional sewing system, the transferring sequence with respect to the workpiece is provisionally fixed, and the sewing program is provisionally stored in each of the sewing machines. Therefore, in case of modifying the kinds of the workpiece or modifying the sewing sequence, an operator must alter the stored contents, or charge the positional sequence of the sewing machines.

In another aspect, according to the conventional system, numbers of mechanical components in the entire system are increased to increase production cost, since the workpiece feed-in feed-out devices are provided at every stitching step. Furthermore, the installing positions of the sewing machines are limited to restricted positions. Moreover, it would be difficult to establish random manufacturing orders, since the sewing machines are arranged on a basis of the predetermined single manufacturing process.

Furthermore, in the conventional system, if mechanical breakdown occurs in one of the sewing machines, the entire sewing sequence must be suspended, and therefore, high systematic flexibility may not be attainable in the conventional system.

U.S. Pat. No. 3,670,675 discloses a plurality of working stations arranged on a circular layout. Each of the working stations is provided with a sewing machine performing sewing processes different from one another. An indexer is provided at a center portion of the circle, and is steppingly rotated. The indexer is provided with a workpiece clamp extending radially toward each of the working stations. The workpiece held by the workpiece clamp is successively moved by the stepping rotation of the indexer, so that the workpiece is subjected to various sewing processes during its circular travel through each of the working stations. The indexer is however angularly rotated by a given angle, and therefore, the workpiece always undergoes on identical sewing sequence during its circular travel. Further, it would be impossible to simultaneously effect sewings to various types of workpieces.

U.S. Pat. No. 4,608,936 assigned to Cannon Mills Company discloses a sewing system having a device for supplying a textile article cut into rectangular shape, two overedge sewing machines, and a robot. The robot is adapted to supply the rectangular article positioned at the supplying device to the sewing machine with gripping the article by needle gripping means. This robot supplies the articles successively delivered onto the supplying device alternately to one of the sewing machines.

U.S. Pat. No. 4,756,261 assigned to The Shenkar College of Textile Technology and Fashion discloses a gripper detachably securing a workpiece and a pick-and-place robot which transfer a workpiece from one sewing machine to the other when sewing to the workpiece by the one sewing machine is completed. The robot and the sewing machine are controlled by computer controllers. Between the controllers, transmitted only is the operation completion signal.

U.S. Pat. No. 4,510,875 assigned to USM Corporation discloses an automatic sewing system in which a plurality of stitch pattern are formed. This system stores a plurality of stitch patterns, and when a workpiece is supplied, one of the stitch patterns is automatically selected, and when the identical workpiece is again supplied, the next stitch pattern is automatically selected. This technique pertains to a single sewing machine.

SUMMARY OF THE INVENTION

It is therefore, an object of the present invention to overcome the above described drawbacks, and to provide an improved sewing system.

Another object of the invention is to provide such an improved sewing system in which provisional storing as to the sewing program can be dispensed with respect to each of sewing machines, and positional arrangements or orders of the sewing machines are not severely required.

Still another object of the invention is to provide an improved sewing system provided with an identification function in which a centralized control to an entire system is achievable in case of altering kinds of workpiece and operational sequence.

Still another object of the invention is to provide the sewing system wherein provisions of each of the workpiece feed in feed out devices relative to the corresponding sewing machines can be dispensed with, to thereby provide the resultant sewing system at low cost, and a specific sewing can be effected by selectively using a desired one of the sewing machines among the plurality of sewing machines at every sewing.

Still another object of the invention is to provide a flexible sewing system in which decision can be made on operability of one of the sewing machines in precedence over the employment thereof, and a searching to a substitute sewing machine can be promptly conducted instead of a broken sewing machine.

These and other objects of the invention will be attained by providing a sewing system comprising: a holder for holding a workpiece, a plurality of sewing machines capable of performing a programmed sewings, the sewing machine having a reciprocably movable needle, a holding member releasably holding the holder, and driving means effecting relative movement between the needle and the holding member in accordance with a sewing program for the programmed sewing, transferring unit for selectively moving the holder to one of the sewing machines, identification means for identifying a kind of one of the holder and the workpiece, memory unit storing therein the sewing programs and data indicative of transferring destinations of the holder by means of the transferring unit, the sewing programs and the destination data being stored with respect to every kinds of one of the holder and the workpiece, and control unit for reading the sewing program and the destination data from the memory unit in accordance with a result of identification by means of the identification means, and for transmitting the read sewing program to the sewing machine toward which the holder is transferred, as well as for driving the transferring unit in accordance with the destination data.

DETAILED DESCRIPTION OF THE PREFERRED EMBODIMENTS

Figure 1:
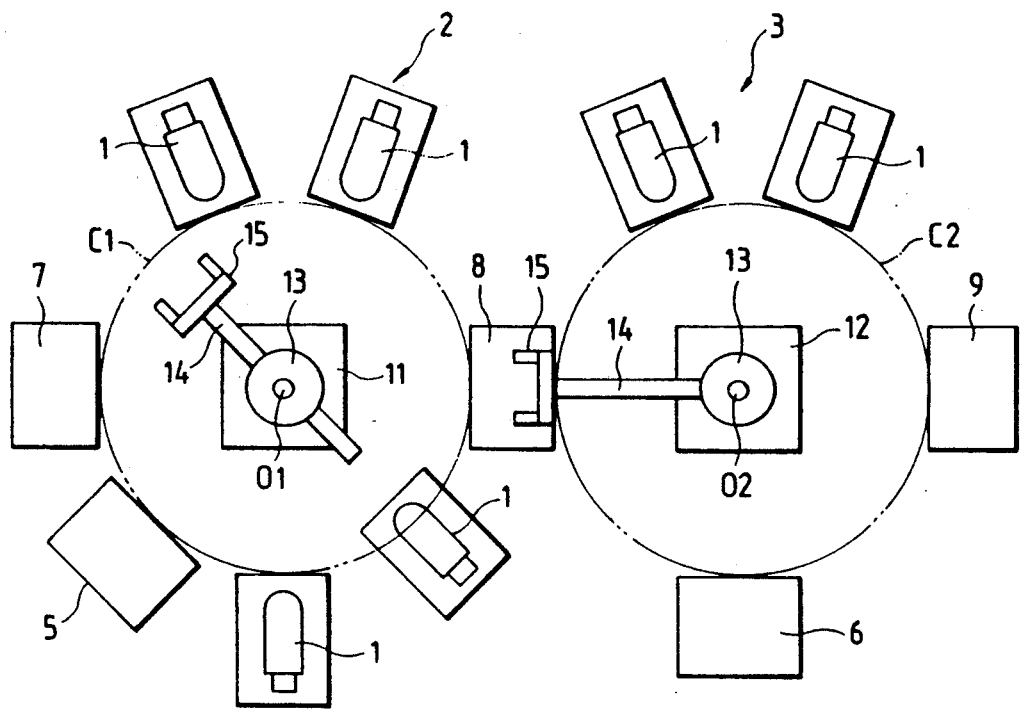
FIG. 1 shows an overall layout showing a sewing system according to one embodiment of this invention.

A sewing system according to one embodiment of the present invention will be described with reference to drawings. As shown in FIG. 1, two groups of sewing machines 1 which are capable of programmed sewings are disposed at circumferentially positioned adjacent respective circles C1, C2 whose centers are given at point 01 and 02.

Figure 3:
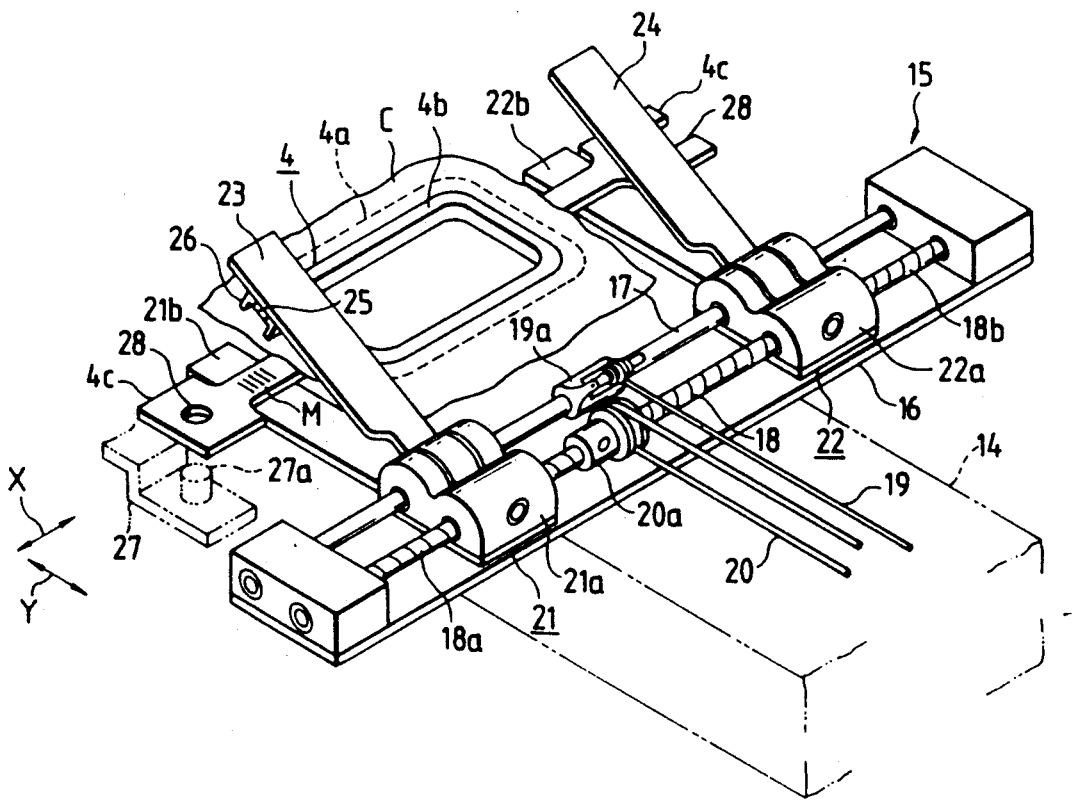
FIG. 3 is a perspective view showing hands and a jig.

Positioned adjacent to these circles C1 and C2, there are provided a plurality of jig stations 5 and 6 and a plurality of working tables 7, 8 and 9. The jig stations are adapted for stacking a jig 4 as shown in FIG. 3, and the working tables are adapted for stacking a plurality of fabrics C as the workpieces as well as for attaching and detaching the fabrics to and from the jigs 4 and for mounting the fabric C on the table during sewing operation to the fabric C or after the completion of sewing. The jig is generally referred to as a holder for holding a workpiece C.

Further, as shown in FIG. 3, the jig 4 has an outer frame 4a and an inner frame 4b. The fabric C is mounted over the outer frame 4a and the inner frame 4b is fitted with the outer frame so that the fabric C is held by the jig 4. The outer frames 4a has side portions from which interposed pieces 4c and 4c extend. One of the interposed pieces 4c is formed with an identification mark M such as a bar code.

As shown in FIG. 1, a pair of conventional type transfer robots 11, 12 which constitute a transferring unit are disposed. Each of the robots is disposed at the center point 01 an 02 of the groups of sewing machines 2 and 3. Each of the robots 11 and 12 is provided with a base 13 which is rotatably and vertically movably provided. The base 13 has an operation arm 14 telescopically movable in radial direction thereof. The base 13 and the operation arm 14 are actuated by a conventional actuator (not shown). Further, as shown in FIG. 3, a hand 15 is mounted on a tip end portion of the operation arm 14 through a base plate portion 16.

As shown in FIG. 3, a spline shaft 17 and a screw shaft 18 extending in parallel with each other are reciprocally and rotatably supported on the base plate portion 16 of the hands 15. Further, wires 19 and 20 are operably connected to central portions of the spline shaft 17 and the screw shaft 19, respectively through connecting members 19a and 20a for transmitting power from a power source (not shown) to these shafts. Further, at both sides of the connecting member 20a, a pair of threads 18a and 18b having spiral direction different from each other are engraved on an outer peripheral surface of the screw shaft 18. A pair of clamp 21, 22 have base block portions 21a, 22a reciprocally supported on the two shafts 17, 18, and the base block portions 21a, 22a integrally provide supporting plates 21b, 22b extending in sidewise in parallelism. Operation plates 23, 24 have their base end inserted into the spline shaft 17 on the base block portions 21a, 22a. The interposed pieces 4c, 4c are interposed between the supporting plates 21b, 22b and the operation plates 23, 24.

In accordance with the reciprocal motion of the spline shaft 17, the operation plates 23, 24 are integrally moved toward and away from the supporting plates 21b, 22b so as to hold or release the jig 4. Further, upon rotation of the screw shaft 18 in one direction, the clamps 21 and 22 are moved away form each other because of the threading functions of the thread portions 18a, 18b, and upon rotation of the screw shaft 18 in opposite direction, the clamps 21 and 22 are moved toward each other by the threading function of the threaded portions 18a 18b. In this case, the jig 4 is held by the plates 23, 24 and the plates 21b, 22b, or is released therefrom.

Further, a sensor 25 is provided at one of the operation plates 23 for reading the identification mark M formed on the jig 4, and a guide piece 26 is provided at the operation plate 23 so as to guide travel of the sensor 25 toward the identification mark M when the clamps 21, 22 are moved toward and away from the jig 4 after the jig 4 is clamped.

On the other hand, a pair of linkage pieces 27 (in FIG. 3 only one of the pieces is shown) is provided at each of the sewing machines 1 for connecting the jig 4 to the sewing machine 1. Each of the linkage pieces 27 is provided with a protrusion 27a engageable with a perforation 28 formed in the interposed piece 4c. And the jig 4 is coupled to the linkage piece 27 through the engagement between the protrusion 27a and the perforation 28. In this coupling state, the sewing machine 1 is operated, and the linkage pieces 27 are moved in X and Y directions by means of a conventional drive means which includes X-, Y- stepper motors (not shown), so that the fabric C on the jig 4 is subjected to feeding with respect to the sewing machine needle. Relative moving or stitching path between the jig 4 and the needle is represented by a sewing program. A sewing machine controlling device described later is adapted to read the supplied sewing programs and to move the linkage piece 27 in X and Y directions through the drive means.

Figure 2:
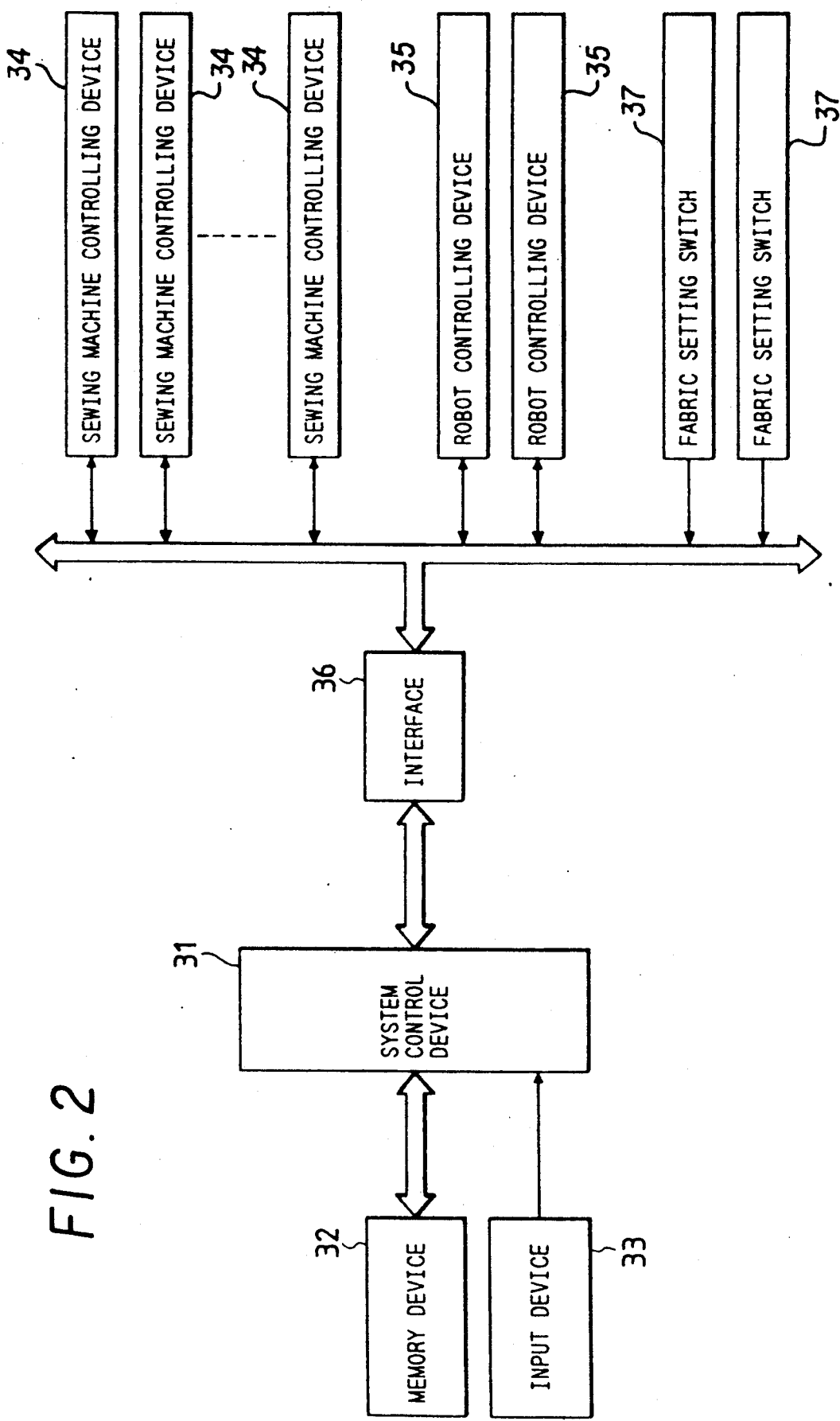
FIG. 2 is a block diagram showing a control device for the sewing system.

Next, control device for the sewing system will be described. As shown in FIG. 2, a system control device 31 for controlling an overall system is constituted with a microcomputer, and an external memory device 32 is connected to the system control device 31. In the external memory device 32, there are stored allotment data and a sewing sequence code number set for each of the sewing machines 1 as shown in Table 1.

TABLE 1

| SEWING MACHINE NUMBER | SEWING OPERATION CODE NUMBER | KIND OF OPERATION | JIG NUMBER | STITCHING PATTERN SIZE (mm) | SEWING PROGRAM |
| --- | --- | --- | --- | --- | --- |
| 2 (4) | 1 | line stitching | 1 | 50 | first sewing process in operation code No. 1 |
| 5 (7) | 1 | line stitching | 2 | 110 | second sewing process in operation code No. 1 |
| 1 (9) | 2 | pattern stitching | 3 | 80 × 80 | first sewing process in operation code No. 2 |
| 3 | 2 | line stitching | 4 | 50 | second sewing process in operation code No. 2 |
| 6 | 3 | pattern stitching | 5 | 100 × 100 | first sewing process in operation code No. 3 |
| 10 (12) | 3 | embroidery | 6 | 90 × 90 | second sewing process in operation code No. 3 |
| 11 | 4 | pattern stitching | 7 | 150 × 80 | first sewing process in operation code No. 4 |
| 8 | 4 | line stitching | 8 | 130 | second sewing process in operation code No. 4 |

The allotment data includes a sewing machine number, sewing program, kinds of sewing (stitch pattern formation or embroidered design pattern formation), jig number (provided in the order of process) and size of the sewing pattern provided in accordance with the sewing program. The sewing sequence code number is set at every sewing operation conducted by combining a plurality of sewing machines. Further, in the column of the sewing machine number shown in Table 1, the parenthesized numbers indicate substitute sewing machines. Further, the system control device 31 is provided with an input device 33 which inputs a signal indicative of sewing program and a system actuation signal.

Each of the sewing machines 1 and the each of the transferring robots 11, 12 are provided with a sewing machine controlling device 34 and a robot controlling device 35, respectively. These are connected to the system control device 31 through an interface 36. The sewing machine controlling device 34 includes a malfunction detecting flag and an operation flag. The malfunction detecting flag is set or reset in response to a signal from a sensor (not shown) provided in the sewing machine which sensor detects malfunction such as thread cutting. The operation flag is set or reset in accordance with the operative and inoperative states of the sewing machine 1. The system control device 31 monitors the condition of the sewing machine 1 responsive to the flags. Further, each of the working tables 7 thru 9 is provided with a fabric setting switch 37. After the fabric C is mounted on the jig 4 by an operator, the switch 37 is operated, so that the fabric setting signal is inputted into the system control device 31 through the interface 36.

Next, operation mode of the above described sewing system will be described. In a step S1 (hereinafter simply referred to as S1, and the same is true with respect to other steps) in a flowchart shown in FIG. 4(a), when the sewing sequence code number consisting of two sewing steps is inputted by the input device 33, the system control device 31 reads a plurality of allotment data corresponding to the code number from the external memory device 32, and the sewing machine number in each of the allotment data is temporarily stored (S2, S3).

Thereafter, in S4 and S5, the system control device 31 effects judgements on employability of the sewing machine corresponding to each of the sewing machine numbers and the existence of the substitute machine on a basis of each of the flags in the sewing machine controlling device 34. If decisions made in steps are both NO, error display appears on a display panel (not shown) of the input device 33. Incidentally, in this embodiment, the sewing machine controlling device 34 is provided with a decision means (not shown) which decides operation or inoperation state of the sewing, and with a sensor (not shown) which detects malfunction such as accidental thread breaking. Therefore, the decision as to the employability of the sewing machine is executed on the basis of the output signals from the decision means and the sensor.

On the other hand, if the decision made in step S4 is YES, after the system control device 31 transmits sewing programs to each of the sewing machines in accordance with the allotment data, the transferring orders of the jigs 4 from one sewing machine to the other is determined in accordance with the sewing process, and the data is transmitted to each of the robot controlling devices 35 connected to each of the transferring robots 11, 12 (S7 thru S9). However, if the decision made in step S4 is NO, and the decision made in step S5 is YES, the system control device 31 performs processings along the steps S7 thru S9, after storing the sewing machine number of the substitute machine which number is newly inputted upon the replacement of the sewing machine number associated with the non-employable sewing machine in S10.

Figure 4A:
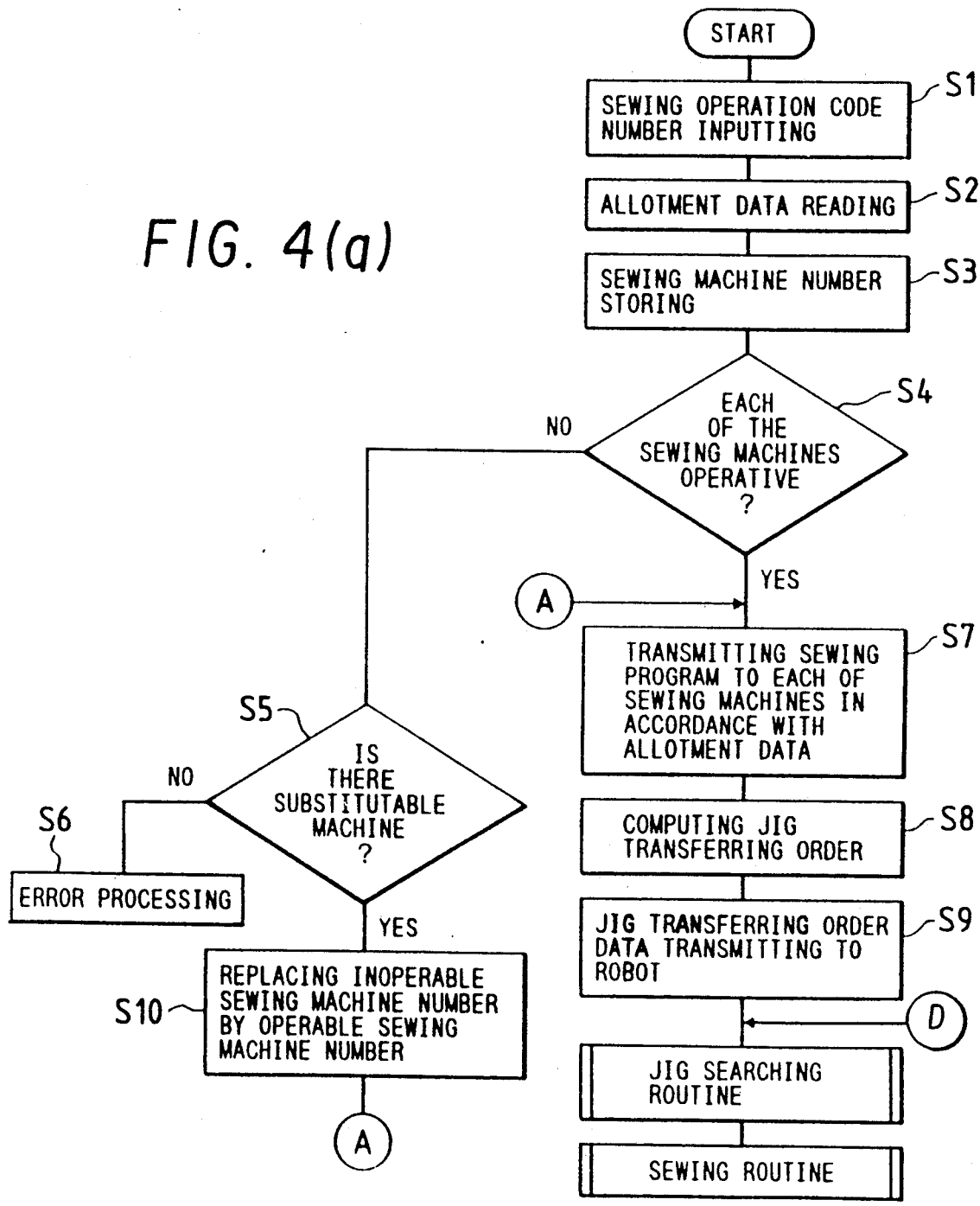
FIG. 4(a) through 4(c) are flowcharts.
Figure 4B:
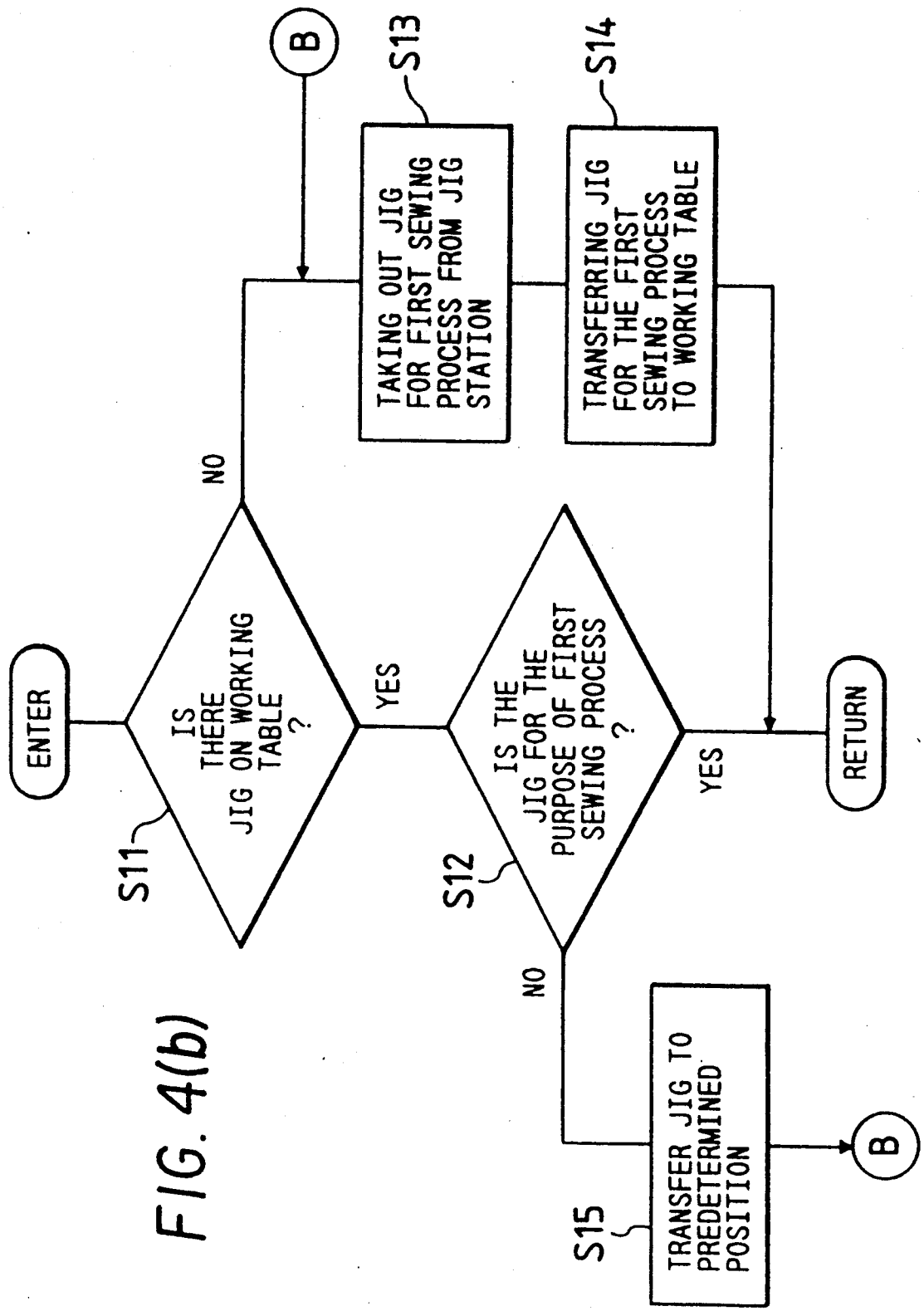
Figure 4C:
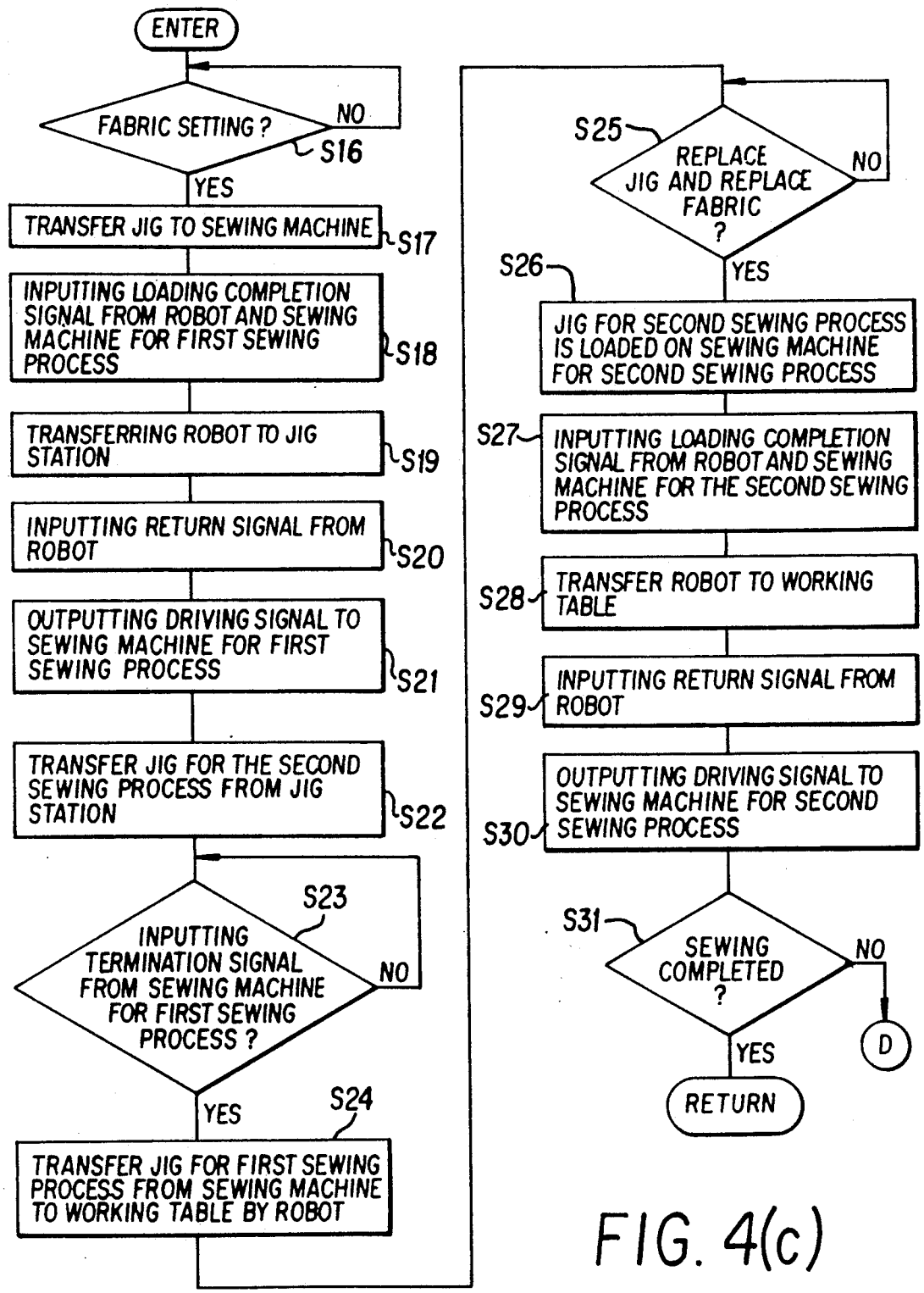

Then, a program proceeds into a jig search routine shown in FIGS. 4(a) and 4(b). The hands 15 of each of the transferring robots 11, 12 moved on each of the working tables 7 thru 9, and the detection of the jig 4 is made by the sensor 25, so that the system control device 31 decides existence or non-existence of the jig 4 on the table (S11). If the decision made in step S11 is YES, that is, if the jig 4 is provided on at least one of the working tables 7-9, the decision is made based on the identification mark M by the system control device 31 as to whether or not the jig 4 is for the purpose of the first sewing step in S12. If the decision is YES, the program proceeds to the sewing routine shown in FIGS. 4(a) and 4(c).

On the other hand, if no jig 4 is provided on any one of the working tables 7-9 so that the decision in step S11 is NO, the system control device 31 operates the hands 15 of the transferring robots 11, 12 so as to automatically take out the jig 4 for the first sewing step, and the jig 4 is moved onto the working table 7-9 (S13, S14). Then, the program proceeds to the sewing routine.

Further, if the jig 4 on the working table 7-9 is unavailable for the first sewing process, the decision made in step S12 is NO. Then, after the jig 4 is transferred to a predetermined position such as the jig station 5, 6 by the transferring robot 11, 12 in step S15, the system control device 31 successively performs processing steps S13 and S14, and the program proceeds to the sewing routine.

In the initial step S16 of the sewing routine, after the fabric C is set on the jig 4 by the operator, the fabric setting switch 37 is operated and the fabric setting signal is inputted, the system control device 31 controls operation of the transferring robot 11, 12 in step S17, and the jig 4 together with the fabric C are transferred to the sewing machine which performs the first sewing process. In step S18, when the interposed piece 4c of the jig 4 is connected to the connecting piece 27 of the sewing machine, which performs the first sewing process, by the hand 15 of the transferring robot 11, 12, the robot controlling device 35 and the sewing machine controlling unit 34 associated with the sewing machine performable as the first sewing machine transmit a signal to the system control device 31, which signal is indicative of completion of loading of the respective jigs 4.

Incidentally, the interconnection and non-connection between the jig 4 and the connecting piece 27 of the sewing machine 1 is detected by a sensor (not shown) connected to the respective controlling devices 34, 35. The controlling devices 34, 35 output the loading completion signal based on the detection signal.

Next, the system control device 31 moves the transferring robots 11, 12 to the jig stations 5, 6 for providing their stand-by positions, and after completion of these movements and after a return signal from the robot controlling device 35 is inputted, the device 31 outputs a sewing machine actuation signal to the sewing machine which is capable of performing the first sewing process (S19-S21). Here, the sewing machine controlling device 34 associated with the sewing machine 1 for the first sewing process will operate the sewing machine 1 in response to the sewing machine actuation signal, so that the machine can perform sewing in accordance with the allotment data.

Subsequent to the step S21, the system control device 31 operates the transferring robot 11, 12 and their hands 15 in order to transfer the jig 4 for the second sewing process from the jig station 5, 6 to the working table 7-9 in step S22. Thereafter, in step S23, the system control device 31 is ready for receiving a sewing completion signal from the sewing machine controlling device 34 associated with the sewing machine 1 for the first sewing process. After inputting the signal, the jig 4 for the first sewing process is removed from the sewing machine 1 for the first sewing process and is transferred to the working table 7-9 by the transferring robot 11, 12 (S24).

Then, when the fabric setting siganl is inputted upon manipulation of the fabric setting switch 37 on the working table 7-9 after the fabric C is disassembled from the jig 4 used for the first sewing process and is assembled to the jig 4 used for the second sewing process by the operator, decision made in the step S25 is YES. Then, the system control device 31 moves the jig 4 usable for the second sewing process to the sewing machine 1 usable for the second sewing process in the next step S26, and the jig 4 for the second sewing operation is connected to the sewing machine for the second sewing process by means of the transferring robot 11 12.

In this instance, a load completion signal is inputted from the robot controlling device 35 and the sewing machine controlling device 34 associated with the sewing machine for the second sewing process (S27).

Next, the system control device 31 moves the transferring robot 11, 12 to the working table 7-9 for providing their stand-by positions (S28). Then, similar to the steps S20 and S21, the system control device 31 receives a return signal from the transferring robot 11, 12 and transmits actuation signal to the sewing machine controlling device 34 associated with the sewing machine for the second sewing process in steps S29 and S30. Here, the sewing machine controlling device 34 operates the sewing machine 1 for the second sewing process in response to the sewing machine actuation signal, so that the sewing machine can perform sewing in accordance with the allotment data. Accordingly, the sewing operation along the first and second sewing process is completed.

Next, if the sewing operation is intended with respect to the next fabric C, decision made in step S31 becomes NO, and the program returns to the jig searching routine. Thereafter, subsequent processing is repeated. In case where the decision made in step S31 is YES, operation of the entire sewing system is suspended. Further, after termination of the operation in the system, identical sewing operational cycle can be repeatedly executed, and execution cycle number can be displayed on the display panel. Further, iterative number can be provisionally inputted from the input device 33 and the remaining cycles can be displayed on the display panel. Incidentally, the above description pertains to a case where two sewing machines capable of performing first and second sewing processes are employed for conducting the sequential sewings. However, it would be apparent that the same program may be executed in case of using not less than three sewing machines.

As described above, in the foregoing embodiment, as a result of the identification to the jig 4, corresponding sewing program and the destination data are read from the external memory device 32, and then, the sewing program is supplied to the sewing machine 1 and the transferring robot 11, 12 is driven in accordance with the destination data. As a result, the entire system is centralizedly controlled by the system control device 31. Accordingly, it is unnecessary to provisionally store the sewing programs in each of the sewing machines 1, and even if the kinds of the workpiece C is changed and the sewing sequence is altered, it is unnecessary to alter the contents of the memory in every sewing machine and it is also unnecessary to change mutual positions or arrangements of the sewing machines even if the transferring sequence of the jig is altered.

Further, in the foregoing embodiment, since the each of the transferring robots 11 and 12 is disposed at the center portion of each of the circular arrays of the sewing machine groups 2 and 3, it is not necessary to provide the transferring robot at every sewing machine 1. Therefore, entire sewing system can be provided at low cost. Further, various sewing modes are achievable by selectively using the desired numbers of the sewing machines among the plurality of machines.

Furthermore, in the above embodiment, employability or operability of the designated sewing machine to which the jig is moved is judged by the system control device 32 which functions as the judgement means. If the judgement reveals that the designated sewing machine is operable, the system control device 31 which also functions as a first control means transmits the sewing program to the designated sewing machine and controls the transferring robot 11, 12. On the other hand, if the judgement reveals that the designated sewing machine is inoperable, the system control means which also functions as a second control means will search a substitutable sewing machine, and sends the sewing program to the substitutable sewing machine. Further, the second control means also operates the transferring robot 11, 12 for transferring the jig 4 to the substitutable sewing machine. Therefore, if the designated sewing machine is broken or is under exact operational phase, the substitutable sewing machine can be automatically searched, and the latter machine is used for maximumly making use of the sewing machines in the sewing system. As a result, the flexible system results.

Figure 5:
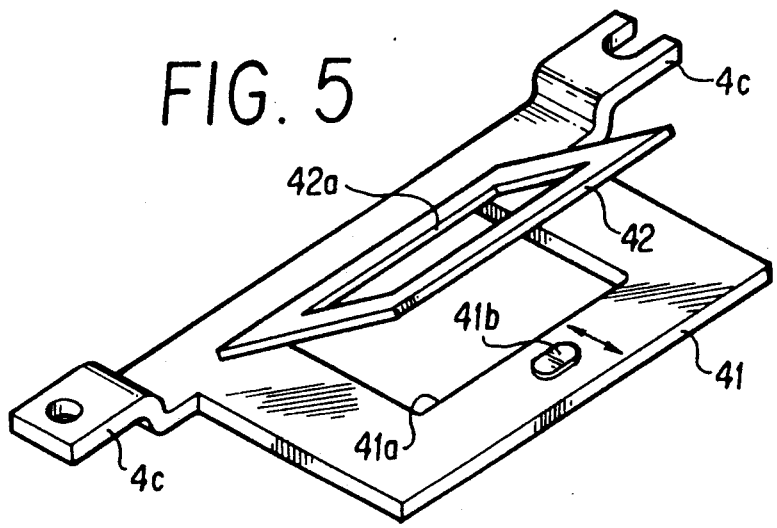
FIG. 5 is a perspective showing a modified jig.

Incidentally, the present invention is not limited to the above described embodiment, but other modifications may be conceivable in the following manners:

(a) As shown in FIG. 5, the jig 4 is constituted by a supporting plate 41 and a holding plate 42. The supporting plate 41 is formed with a needle passing hole 41a and has a locking piece 41b and a pair of interposed pieces 4c. The holding plate 42 is formed with a needle passing hole 42a and has one side edge pivotally supported by the supporting plate 41. In interposing the fabric C between the holding plate 42 and the supporting plate 41, the locking piece 41b holds the holding plate 42 at its closed locking position against a biasing force of a spring (not shown). The holding plate 42 can be pivotally moved to its open position by the biasing force of the spring when the locking piece 41b is slidingly moved to a predetermined direction.

Figure 6:
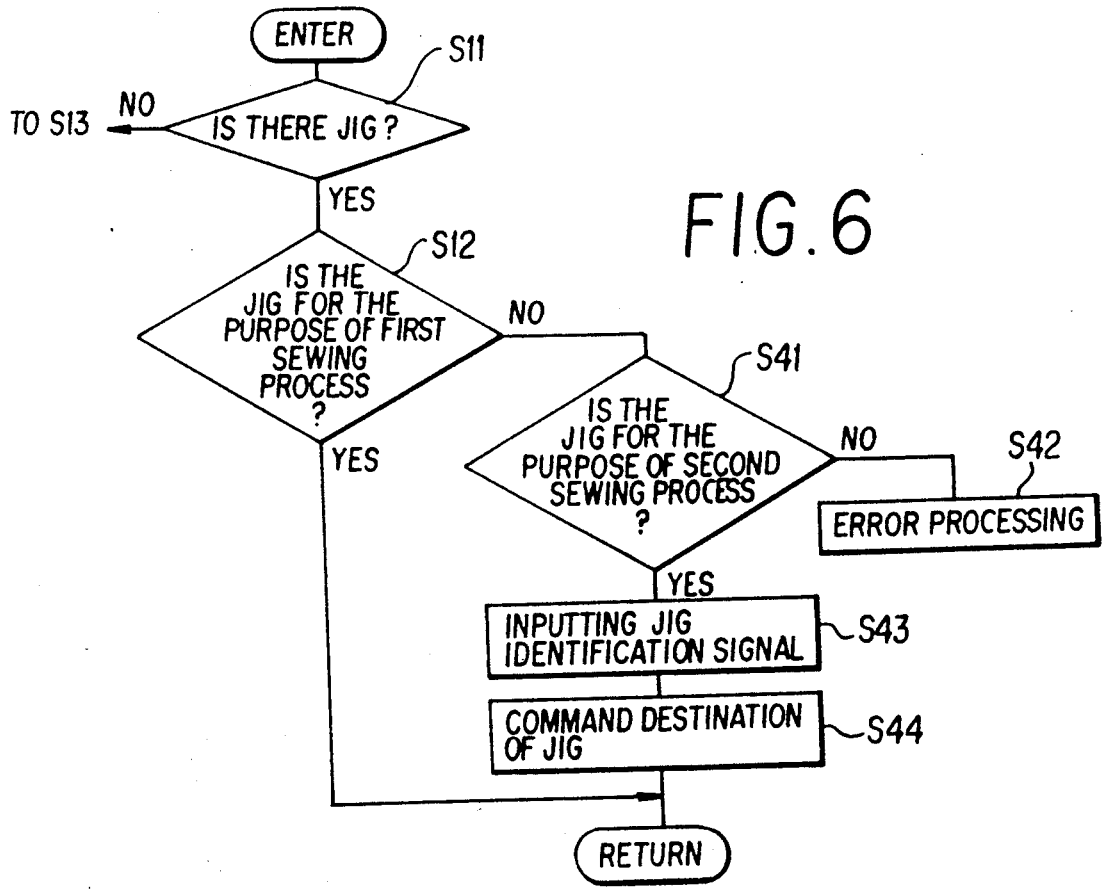
FIG. 6 is a flow chart showing another jig searching routine.

(b) It is possible to provide a jig searching routine in a manner shown in FIG. 6. In this case, when the decision made in step S12 is NO, the system control device 31 determines in step S41 as to whether or not the jig 4 on the working table 7-9 is for the purpose of the second sewing process. If the decision made in step S12 is NO, a predetermined error process is effected (S42). If the decision made in step S41 is YES, the system control device 31 receives a jig identification signal from the sensor 25, and in response to the jig identification signal, the system control device 31 makes alterations to the sewing machine 1 and sends command signal to the transferring robot 11, 12 (S43 S44). Thereafter, sewing along the second sewing process is carried out by the sewing machine used for the second sewing process in precedence over the first sewing process. Therefore, in this case, sewing machine can be selectively used in accordance with the kinds of the jigs arranged on the working table 7-9.

(c) It is possible to automatically install the fabric C relative to the jig 4 by means of the transferring robot.

(d) Another sewing system can be provided by a plurality of sewing machines and a single transferring robot disposed at a center portion of an array of the sewing machines.

(e) Another system can be provided by transmitting an information as to execution cycle of each of the sewing machine, i.e., information as to the productivity, to the system control unit 31, and displaying such information and allotment data in a CRT screen (not shown) or with a printer (not shown).

(f) The identification mark M is affixed to the fabric or the workpiece C, so that the identification unit 25 and M can detect kinds of the fabric.

As described in detail above, in the present invention, provisional storing of the sewing program into the respective sewing machine is not required. Further, fixed positional order of the plurality of sewing machines is not required. Even if kinds of the fabric are changed or the sewing sequence is altered, sewing can be automatically and stably performed by centralized control to the entire system.

Further, in the present invention, it is unnecessary to provide a workpiece feed in feed out device at every sewing machines, and therefore, overall sewing system can be provided at low cost. And, in the invention, a desired sewing machine can be selectively used among a plurality of the sewing machines in accordance with various sewing modes, so that desired sewing can surely be achieved.

Furthermore, in the present invention, decision is made on operability of the designated sewing machine prior to its actual use. Therefore, flexible sewing operation is achievable by promptly searching the substitutable sewing machine and using the latter, if the designated sewing machine is not usable.

What is claimed is:

1. A sewing system comprising:
   a holder for holding a workpiece;
   a plurality of sewing machines capable of performing programmed sewing, each sewing machine having a reciprocably movable needle, a holding member releasably holding the holder, and driving means effecting relative movement between the needle and the holding member in accordance with a sewing program for the programmed sewing;
   a transferring unit for selectively moving the holder to one of the sewing machines;
   identification means for identifying one of the holder and the workpiece;
   a memory unit storing therein sewing programs and data indicative of transferring destinations of the holder by means of the transferring unit, the sewing programs and the destination data being stored with respect to every kind of one of the holder and the workpiece; and
   a control unit for reading a sewing program and destination data from the memory unit in accordance with a result of identification by means of the identification means and for transmitting the read sewing program to the sewing machine toward which the holder is transferred, as well as for driving the transferring unit in accordance with the destination data.

2. The sewing system as claimed in claim 1, wherein the plurality of sewing machines are disposed in plural groups of circular arrays, of said circular arrays providing center points.

3. The sewing system as claimed in claim 2, wherein the transferring unit comprises transferring robots each being provided for each of the groups of the circular arrays, and wherein each of the transferring robots is disposed at a position adjacent to each of the center points defined by the circular arrays, the transferring robots being adapted for transferring a workpiece stacked at a predetermined position from its stacked position to each of the sewing machines, and for transferring the workpiece from one sewing machine to another sewing machine.

4. The sewing system as claimed in claim 3, wherein the transferring unit comprises a rotatable arm having one end, an actuator for rotating the arm, and a gripper provided at the one end of the arm for releasably gripping the holder, and wherein the identifiction means comprises a bar code provided on one of the holder and the workpiece, and a code reader provided on the gripper.

5. A sewing system comprising:
a holder for holding a workpiece;
a plurality of sewing machines capable of performing programmed sewing, each of the sewing machines having a reciprocally movable needle, a holding member releasably holding the holder, and driving means effecting relative movement between the needle and the holding member in accordance with a sewing program for the programmed sewing;
a transferring unit disposed substantially equidistantly with respect to each of the plurality of sewing machines for selectively moving the holder to one of the sewing machines;
identification means for identifying a kind of one of the holder and the workpiece;
a memory unit storing therein sewing programs and data indicative of transferring destinations of the holder by means of the transferring unit, the sewing programs and the destination data being stored with respect to every kind of one of the holder and the workpiece; and
a control unit for reading a sewing program and destination data from the memory unit in accordance with a result of identification by means of the identification means, and for transmitting the read sewing program to the sewing machine toward which the holder is transferred, as well as for driving the transferring unit in accordance with the destination data.

6. A sewing system comprising:
a holder for holding a workpiece;
a plurality of sewing machines disposed to consist of at least one circular array which defines a central point, each of the sewing machines performing programmed sewing and having a reciprocally movable needle, a holding member releasably holding the holder, and driving means effecting relative movement between the needle and the holding member in accordance with a sewing program for the programmed sewing;
a transferring unit disposed at a position adjacent to the central point of the circular array for selectively moving the holder to one of the sewing machines;
identification means for identifying a kind of one of the holder and the workpiece;
a memory unit storing therein sewing programs and data indicative of transferring destinations of the holder by means of the transferring unit, the sewing programs and the destination data being stored with respect to every kind of one of the holder and the workpiece; and
a control unit for reading a sewing program and destination data from the memory unit in accordance with a result of identification by means of the identification means, and for transmitting the read sewing program to the sewing machine toward which the holder is transferred, as well as for driving the transferring unit in accordance with the destination data.

7. A sewing system comprising:
a holder for holding a workpiece;
a plurality of sewing machines capable of performing programmed sewing, each of the sewing machines having a reciprocally movable needle, a holding member releasably holding the holder, and driving means effecting relative movement between the needle and the holding member in accordance with a sewing program for the programmed sewing;
a transferring unit for selectively moving the holder to one of the sewing machines;
identification means for identifying one of the holder and the workpiece;
a memory unit storing therein sewing programs and data indicative of transferring destinations of the holder by means of the transferring unit, the sewing programs and the destination data being stored with respect to every kind of one of the holder and the workpiece; and
a control unit comprising reading means for reading sewing program and destination data from the memory unit in accordance with a result of identification by means of the identification means, and for transmitting the read sewing program to the sewing machine toward which the holder is transferred, as well as for driving the transferring unit in accordance with the destination data;
judgement means for effecting a decision on employability of the sewing machine associated with the destination data;
a first control means for supplying the sewing program to the sewing machine and for controlling the transferring unit in accordance with the destination data where the decision made in the judgement means reveals that the sewing machine is employable; and
a second control means for searching a substitute sewing machine and supplying the sewing program to the substituted sewing machine as well as for controlling the transferring unit so as to allow the holder to be transferred toward the substituted sewing machine where the decision made in the judgement means reveals that the sewing machine is inoperable.

* * * * *